United States Patent [19]

Dorler et al.

[11] 3,787,734

[45] Jan. 22, 1974

[54] VOLTAGE REGULATOR AND CONSTANT CURRENT SOURCE FOR A CURRENT SWITCH LOGIC SYSTEM

[75] Inventors: Jack A. Dorler; Donald J. Swietek, both of Wappingers Falls, N.Y.

[73] Assignee: International Business Machines Corporation, Armonk, N.Y.

[22] Filed: May 26, 1972

[21] Appl. No.: 257,121

[52] U.S. Cl. ................. 307/203, 307/296, 307/254, 323/22 T

[51] Int. Cl. .......................................... H03k 17/00

[58] Field of Search.... 307/296, 297, 203; 323/1, 4, 323/22 T

[56] References Cited

UNITED STATES PATENTS

| | | | |
|---|---|---|---|
| 3,458,719 | 7/1969 | Weiss | 307/296 |
| 3,509,363 | 4/1970 | Jen et al. | 307/203 |
| 3,628,053 | 12/1971 | Weiss | 307/203 |
| 3,524,124 | 8/1970 | Perkinson | 323/1 |

OTHER PUBLICATIONS

I.B.M. Tech. Disclosure Bulletin, "Single Voltage Supply, High-Performance Logic Circuit" M.P. Xylander, Vol. 11, No. 9, page 1099, 2/69.

*Primary Examiner*—John S. Heyman
*Assistant Examiner*—B. P. Davis
*Attorney, Agent, or Firm*—Kenneth R. Stevens

[57] ABSTRACT

A voltage regulator circuit for energizing a constant current source for use in a current switch logic scheme.

4 Claims, 1 Drawing Figure

PATENTED JAN 22 1974
3,787,734
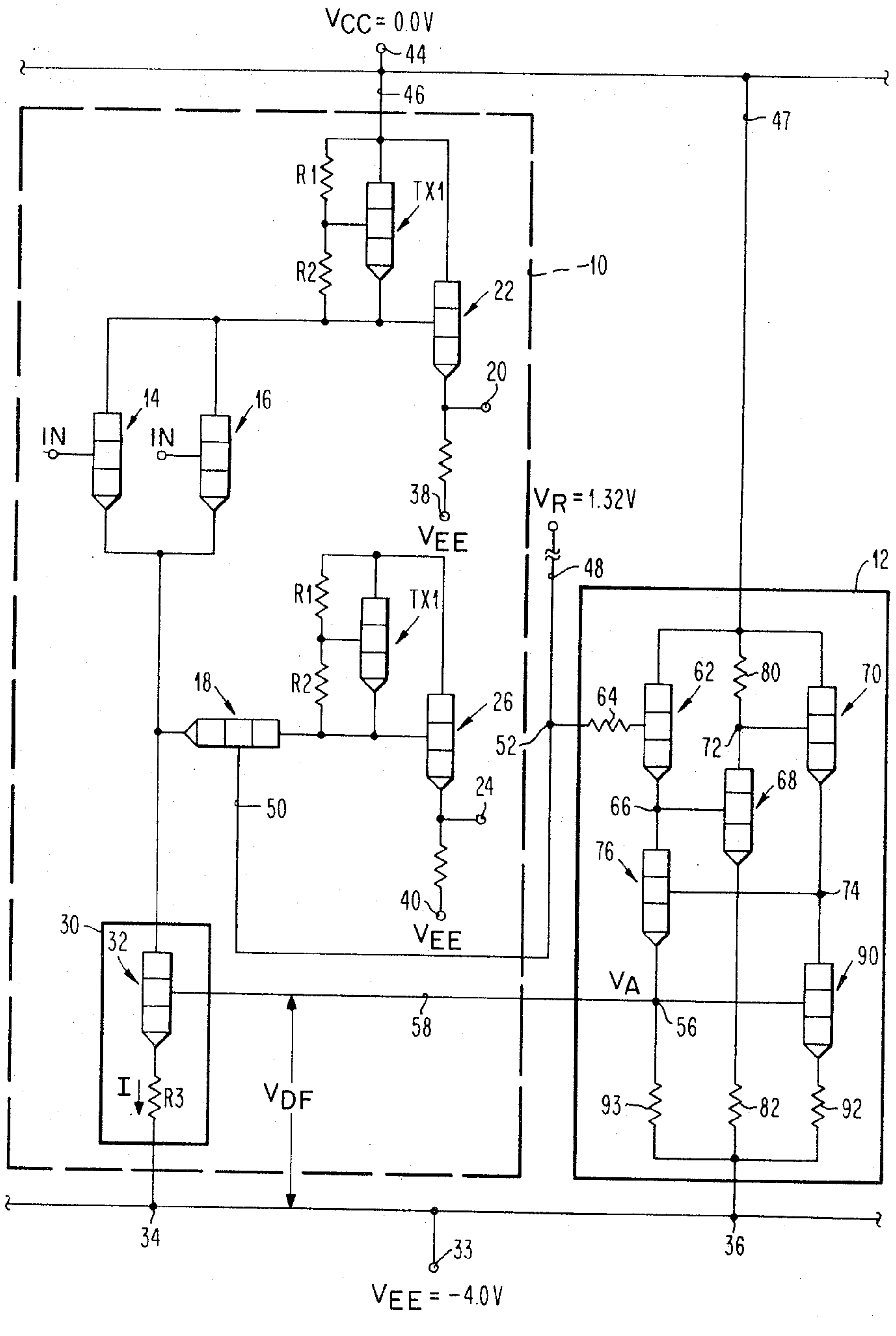

VOLTAGE REGULATOR AND CONSTANT CURRENT SOURCE FOR A CURRENT SWITCH LOGIC SYSTEM

BACKGROUND OF THE INVENTION

In the current switch logic family, a constant current source is connected to the emitters of the input switching transistors. This is illustrated in such prior art patents as Yourke, U.S. Pat. No. 2,964,652 and Cavaliere, U.S. Pat. No. 3,505,535, both assigned to the same assignee as that of the present invention. Initially, this current source was constituted by a resistor and voltage source combination and is so described in the above-cited patents. The overall performance of the current switch logic circuit is dependent upon the ability of the constant current source to provide a predetermined value of current deposite dynamic variations in temperature, voltage supplies, and circuit components. Efforts have been mounted to provide more sophisticated active circuit elements as substitutes for the constant current source in order to make improvements over resistor and voltage source combination.

SUMMARY OF THE INVENTION

Therefore, it is an object of the present invention to provide and improved constant current source output which does not vary with dynamic changes associated with one of the main power supplies to the current switch logic family, but yet which also varies or tracks in a predetermined manner with another power supply to the current switch logic family, namely, the reference voltage or threshold voltage connected to the reference transistor. The reference voltage is sometimes denoted by the term "threshold voltage level" or that voltage level at which the current switch logic circuit begins to switch from one state to another upon the application of either an up or down voltage level to the input switching transistors of the current switch circuit.

Another object of the present invention is to provide a current switch type logic circuit having improved noise tolerance. Noise tolerance, measured in voltage, is the difference between the threshold voltage and the steady state up or down signal applied to the input switching transistor of the current switch circuit. The magnitude of this difference is a reflection or indication of the ability of the current switch circuit to change states only upon the application of a true signal, i.e., immune to false switching due to a noise or false signal level.

Another object of the present invention is to provide a current switch logic circuit having improved component, temperature, and voltage tracking characteristics.

Accordingly, the present invention provides an improved constant current source for a current switch logic circuit wherein the constant current source is controlled by a voltage regulator. The voltage regulator translates and inverts a voltage supply which is also used as a reference voltage for the current switch circuit per se. The translated and inverted output voltage from the voltage regulator is used to selectively control the constant current source.

The foregoing and other objects, features and advantages of the invention will be apparent from the following more particular description of the preferred embodiment of the invention as illustrated in the accompanying drawings.

BRIEF DESCRIPTION OF THE DRAWINGS

FIG. 1 is an electrical schematic diagram illustrating a current switch logic circuit and the voltage regulator circuit for critically controlling a constant current source within the current switch logic circuit.

BRIEF DESCRIPTION OF THE PREFERRED EMBODIMENT

Now referring to FIG. 1, it illustrates a basic current switch logic block 10 connected to a voltage regulator circuit 12. The current switch logic block 10 is of conventional design and is described in detail in the previously referred to patents to Yourke and Cavaliere. Briefly, the current switch circuit comprises input switching transistors 14 and 16 which are adapted to receive input binary signals at the input terminals labelled IN. A reference voltage transistor 18 is connected via its emitter terminal to the commonly coupled emitter terminals of transistors 14 and 16. In a well known manner, the base of the reference voltage transistor 18 is connected to a source of reference potential, $V_R$, and is effective to establish a threshold voltage level in order to determine the voltage level at which the input switching transistors 14 and 16 begin to switch state. An out-of-phase output signal is generated at output terminal 20 connected to an emitter-follower output transistor 22, which in turn is connected via its base terminal to the collector terminals of switching transistors 14 and 16. Similarly, an in-phase logic output signal is generated at output terminal 24 connected to an emitter-follower output transister 26, which in turn is connected by way of its base terminal to the collector terminal of reference switching transistor 18. As taught in the Cavaliere patent, the collector terminals of the input switching terminals 14 and 16 and the collector terminal of the reference switching transistor 18 are each connected to an anti-saturation circuit and each comprising a transistor TX1 and a pair of resistors R1 and R2, connected respectively across the base collector and base emitter junctions of the transistor TX1. This anti-saturation control circuit is neither necessary for implementation of the present invention nor is it required for all applications of the current switch block 10, but it is merely illustrated as a variation of the basic current switch in the preferred embodiment.

The current switch logic block 10 further comprises a constant current source 30 comprising a transistor 32 having its collector terminal connected to the emitter terminals of input switching transistors 14 and 16 and its emitter terminal connected via an appropriately valued resistor R3 to a supply voltage terminal 33 at node 34. As previously mentioned in the U.S. patents to Yourke and Caviliere, the constant current source 30 is constituted by a resistor voltage source combination in contradistinction to the transistor-resistor combination disclosed herein.

Both the current switch logic block 10 and the voltage regulator circuit 12 are mutually connected to three separate power supply circuits. The most negative supply source, $V_{EE}$ connected to terminal 33, supplies voltage to both circuits 10 and 12 via modes 34 and 36, as well as to a pair of terminals 38 and 40 within the current switch logic circuit 10. For purposes of clarity, the actual connections between terminals 38 and 40 to the supply terminal 33 are not shown.

Additionally, another power supply source, $V_{CC}$, is connected to power supply terminal 44 for supplying voltage to lines 46 and 47 connected respectively to the current switch logic circuit 10 and the voltage regulator circuit 12. Also, as previously mentioned, a third power supply line 48 supplies a reference voltage, $V_R$, to the base terminal of reference switching transistor 18 via line 50, and also to the input of voltage regulator circuit 12 at node 52. The power supply line 48 is shown broken so as to indicate that this line is adaptable to feed a plurality of other current switch and voltage regulator circuits in actual expanded application.

Now referring to the details of the voltage regulator circuit 12, the circuit receives an input voltage $V_R$ at node 52 and generates an output voltage $V_A$ at output node 56. The output voltage $V_A$ is applied as a control voltage via line 58 to the base terminal of transistor 32, which forms a portion of the constant current source 30. Generally, the voltage regulator circuit 12 functions to translate and invert the applied input voltage $V_R$ to an output voltage $V_A$. The voltage $V_R$ is received by an input translating transistor 62 by way of a coupling resistor 64 connected between node 52 and the base terminal of transistor 62. Transistor 62 translates the voltage $V_R$ to a lower value and applies it to node 66. The input voltage $V_R$ is essentially translated down an amount equal to the base-to-emitter voltage drop of transistor 62. This translated voltage at node 66 is applied to the base terminal of transistor 68 which functions as a one to one voltage level amplifier or inverter for supplying an output voltage to the base of a transistor 70 via a node 72 connected to the collector of transistor 68. Transistor 70 functions as an emitter follower to provide a driving signal to node 74, which in turn is connected to the base terminal of output driving transistor 76.

Transistor 68 functions as a one-to-one voltage inverter because the value of resistor 80 connected between the collector terminal of transistor 68 and the voltage source $V_{CC}$, and the value of resistor 82 connected between the emitter of transistor 68 and the voltage source $V_{EE}$ are selected to be of the same ohmic value. Transistor 90 and resistor 92 are serially connected between nodes 36 and 74. Transistor 90 and resistor 92 primarily provide a constant current source for emitter-follower transistor 70.

Transistor 76 completes the feedback loop and mainly functions as an output driver and current source for the input transistor 62. Any variations in the supply voltage $V_{EE}$ are seen directly as voltage variations at the collector of transistor 68 or node 72. The voltage level at node 72 is directly translated by way of transistor 70 and 76 to an output voltage $V_A$ at node 56, and accordingly, provides excellent voltage tolerance and temperature tracking control. A resistor 93 connected to emitter of transistor 76 provides a load resistor for that current path.

OPERATION

Noise tolerance levels for the current switch logic block are significantly improved due to component, temperature, and voltage tracking characteristics in the following manner. Firstly, due to the fact that the voltage regulator circuit 12 and the current switch logic block 12 both are mutually responsive to voltage sources $V_R$ and $V_{EE}$, the value of current generated by the constant current source 30, schematically denoted I, does not vary with variations in the supply voltage $V_{EE}$, because the difference voltage $V_{DF}$ applied across nodes 56 and 34 remains constant. This can be seen by the following equations:

$$V_{DF}=V_A-(-V_{EE})$$
$$|V_{DF}|=V_{EE}+V_A\approx=|V_R|$$

In other words, the absolute difference voltage, $V_{DF}$ is approximately equal to the absolute value of $V_R$.

Also, the difference voltage $V_{DF}$, is substantially insensitive to dynamic circuit parameter variations. In other words, variations in resistor tolerances ($R_{TOL}$) throughout the entire circuit, variations in the respective base-to-emitter voltage drops ($V_{BE}$) of the individual transistors in the circuit, and the gain or beta ($\beta$) variations between the individual transistors in the circuit are compensated for in that the absolute value of $V_{DF}$ is substantially independent of these collective variations. Mathematically, this can be approximately stated as follows:

$$|V_{DF}| \neq f(R_{TOL}, V_{BE}, \beta)$$

In terms of the current $I$, generated by the constant current source 30, these compensations relating to component variations, voltage source variations, and temperature variations can be stated in the following manner. The value of current $I$ is inversely proportional to the value of the reference voltage source $V_R$. In other words, the current source 30 tracks with variations in the value of voltage $V_R$ as is mathematically expressed as:

$$I=f(1/V_R)$$

Further, as was previously shown in terms of the voltage value $V_{DF}$, the value of current $I$ generated by the constant current source 30 is independent of variations in $V_{EE}$, i.e.

$$I \neq f(V_{EE})$$

Additionally, the unique relationship of the voltage regulator circuit 12 in combination with the constant current supply 30 mutually powered by identical voltage supplies all located on the same monolithic chip give rise to a constant current source which is capable of generating a value of current $I$ which is essentially independent of temperature changes, absolute changes in gain or beta characteristics of the devices, and absolute changes in the base-to-emitter voltage drops of the individual transistors, $V_{BE}$, and is mathematically described by the equation:

$$I \neq f(T, |\beta|, |V_{BE}|)$$

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. In a current switch circuit having at least one input switching transistor and a reference transistor connected thereto, the reference transistor being adapted for direct connection to a first reference voltage supply, the improvement comprising:

a. an active element current source means connected to said at least one input switching transistor and to said reference transistor for providing a regulated current to the current switch circuit, b. a first translating and inverting circuit means being connected at its input terminal (52) to the first reference voltage supply and at its output terminal (56) to said active element current source means, said first translating and inverting circuit means being responsive to the first reference voltage supply for generating a translated inverted driving voltage for controlling said active element current source means.

2. In a current switch circuit having at least one input switching transistor and a reference transistor connected thereto, the reference transistor being adapted for connection to a first reference voltage supply, as in claim 1 wherein:

a. said active element current source means comprises a first transistor and resistor combination, the base terminal of said first transistor being connected to said first translating and inverting circuit means.

3. In a current switch circuit having at least one input switching transistor and a reference transistor connected thereto, the reference transistor being adapted for connection to a first reference voltage supply, as in claim 2 wherein:

a. said active element current source means and said first translating and inverting circuit means include first and second terminals adapted for connection to a second voltage supply, wherein b. the difference between said driving voltage and said second voltage supply provides a resultant voltage source to said active element current source means.

4. In a current switch circuit having at least one input switching transistor and a reference transistor connected thereto, the reference transistor being adapted for connection to a first reference voltage supply, as in claim 3 wherein:

a. said first translating and inverting circuit means includes semiconductor device amplifying and inverting means.

* * * * *